(12) United States Patent
Kageyama et al.

(10) Patent No.: US 7,082,758 B2
(45) Date of Patent: Aug. 1, 2006

(54) HYDRAULIC MACHINE, SYSTEM FOR MONITORING HEALTH OF HYDRAULIC MACHINE, AND METHOD THEREOF

(75) Inventors: Masato Kageyama, Tochigi (JP); Yukio Shoji, Tochigi (JP); Nobumi Yoshida, Tochigi (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 11/130,408

(22) Filed: May 17, 2005

(65) Prior Publication Data

US 2005/0262838 A1 Dec. 1, 2005

(30) Foreign Application Priority Data

May 21, 2004 (JP) .............................. 2004-152047

(51) Int. Cl.
*G01M 3/00* (2006.01)

(52) U.S. Cl. .............................. 60/445; 60/329; 60/453

(58) Field of Classification Search .................. 60/328, 60/329, 453, 445
See application file for complete search history.

(56) References Cited

U.S. PATENT DOCUMENTS 5,563,351 A * 10/1996 Miller ..................... 73/861.42
6,848,254 B1 * 2/2005 Du .............................. 60/448
6,932,902 B1 * 8/2005 Hirasawa et al. ........... 210/168
2004/0226868 A1 * 11/2004 Shoji et al. .................. 210/90

FOREIGN PATENT DOCUMENTS

| JP | 59-194215 | 11/1984 |
| JP | 7-280688 | 10/1995 |
| JP | 8-114183 | 5/1996 |
| JP | 2000-241306 | 9/2000 |

* cited by examiner

*Primary Examiner*—Thomas E. Lazo
(74) *Attorney, Agent, or Firm*—Westerman, Hattori, Daniels & Adrian, LLP.

(57) ABSTRACT

In a hydraulic machine, hydraulic pump failure is detected and the pump lifespan is estimated before the pump failure occurs. The discharge pressure 122, oil temperature 126, and drain filter differential pressure 120 are measured, a correlative relationship 128 between the filter differential pressure and the discharge pressure is determined, and a representative filter differential pressure 130 is calculated from this correlative relationship. Using an oil temperature-differential pressure correlation function, the representative differential pressure value 130 is corrected so that the variable component 132 caused by the oil temperature 126 is eliminated therefrom. The long-term trend and the short-term trend of the increase over time of the corrected differential pressure is calculated. A pump failure is predicted or the pump lifespan is estimated based on the degree of deviation between the long-term trend and the short-term trend.

16 Claims, 6 Drawing Sheets

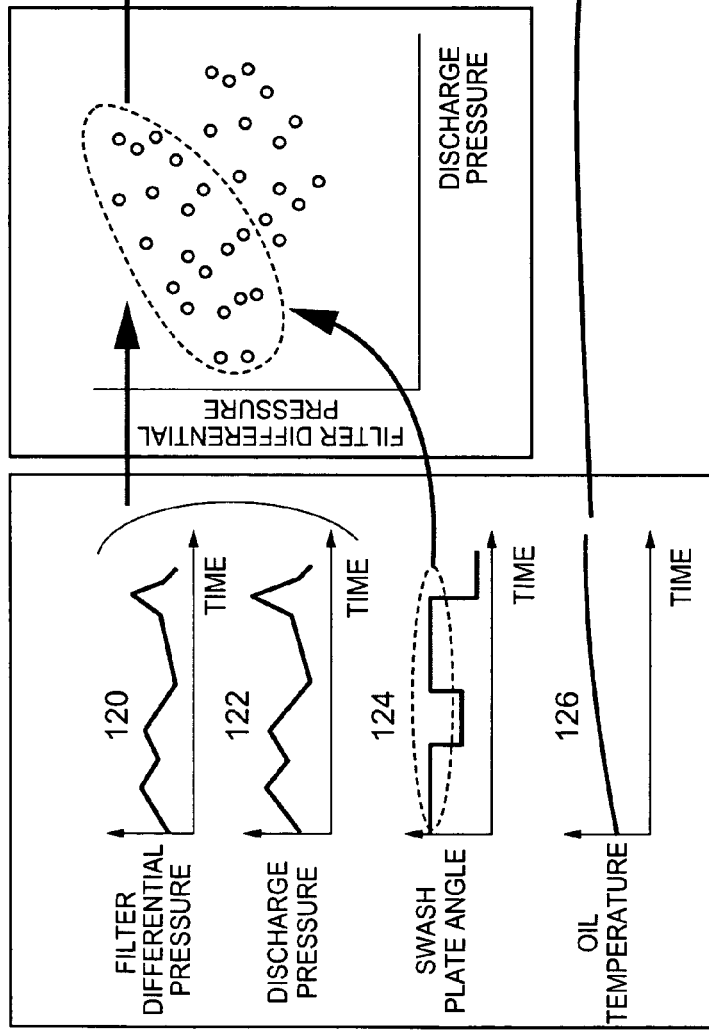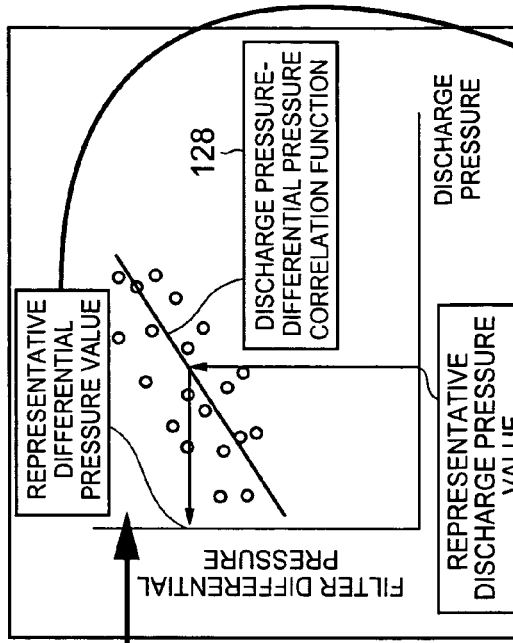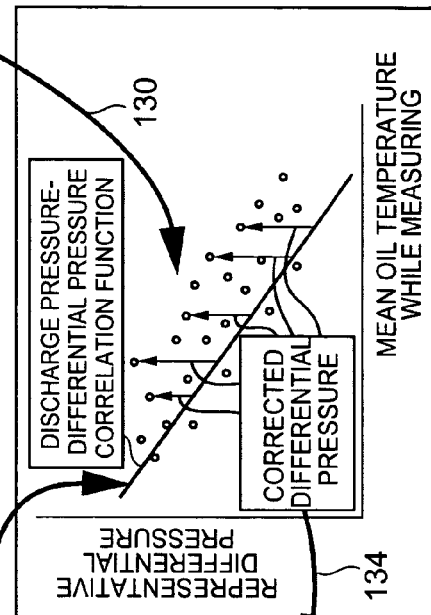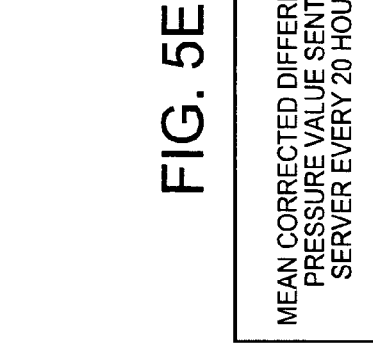
FIG. 5A  FIG. 5B  FIG. 5C  FIG. 5D  FIG. 5E

HYDRAULIC MACHINE, SYSTEM FOR MONITORING HEALTH OF HYDRAULIC MACHINE, AND METHOD THEREOF

CROSS-REFERENCE TO RELATED APPLICATIONS

This application relates to and claims priority from Japanese Patent Application No. 2004-152047, filed on May 21, 2004, the entire disclosure of which is incorporated herein by reference.

BACKGROUND OF THE INVENTION

1. Field of the Invention

The present invention generally relates to a hydraulic machine, and more particularly relates to a hydraulic pump health monitoring system and method thereof for a hydraulic machine.

2. Description of the Related Art

Abnormality detection devices for liquid pumps such as hydraulic pumps have been made known in Japanese Patent Application Laid-open No. S59-194215, Japanese Patent Application Laid-open No. H7-280688, Japanese Patent Application Laid-open No. 2000-241306, and Japanese Patent Application Laid-open No. H8-114183 for instance.

The hydraulic system failure detection device disclosed in Japanese Patent Application Laid-open No. S59-194215 detects factors (such as oil pressure and operating oil temperature or the like) which reduce the life of hydraulic system component units, determines a current momentary degree of reduction of life span based on the measured oil pressure and operating oil temperature, and determines the reduction in life span by a cumulating these degrees of reduction. Furthermore, this device has a warning mechanism which functions after a failure has occurred.

The device for determining wear of a pump shown in Japanese Patent Application Laid-open No. H7-280688 measures the flow in the case drain and the change in flow, and determines that a failure has occurred when a fixed threshold value is exceeded.

The pump failure diagnostic device disclosed in Japanese Patent Application Laid-open No. 2000-241306 has a metal sensor in a drain path and a flow sensor in a discharge path or drain path, and the measured value from one of the sensors is used as a parameter for correcting the detection value of the other sensor. For instance, when the flow rate measured by the flow sensor drops, and a determination is made that pump failure is progressing, a correction is made by applying a larger factor to the metal sensor measurement value, and thereby abnormalities can be more easily detected from the metal sensor measurement value. During normal operation, a separate failure diagnostic mode is provided, and in this failure diagnostic mode, a failure diagnosis is performed using the measurement value from the metal sensor while the pump output variable factors such as angle of inclination, engine speed, and pump load are fixed.

The pump lubrication system warning device shown in Japanese Patent Application Laid-open No. H8-114183 measures the flow rate of lubricating water which flows through the strainer of the pump lubricating system and the differential pressure across the strainer, and if the actual measured value of the differential pressure is greater than the predicted value predicted from the lubricating water flow rate, the strainer will be determined to be plugged and a warning will be issued.

SUMMARY OF THE INVENTION

Predicting the wear of components by recording the history of life reducing factors such as temperature and referring to previous test results, as shown in Japanese Patent Application Laid-open No. S59-194215, is widely used. However, there is a large variation in the wear of components even though the history of the life reducing factors is identical. Therefore, methods based on the history of life reducing factors may be able to adjust the total time period, but cannot accurately predict the occurrence of pump failure and cannot predictively prevent such damage.

Therefore, methods which more directly measure pump damage predictors have been proposed. For instance, the device shown in Japanese Patent Application Laid-open No. H7-280688 measures the case drain flow rate and the change in flow rate to determine failure. Furthermore, the device of Japanese Patent Application Laid-open No. 2000-241306 measures a level of metallic powder which passes through a drain using a metallic sensor provided on the drain path to determine failure. These methods can more accurately detect predictors of pump failure than methods which measure indirect factors such as temperature and operating oil temperature as they are based on a more direct phenomenon for predicting pump failure. However, during operation of a hydraulic machine, the operating conditions of the pump such as pump discharge flow rate, discharge pressure, and operating oil temperature will vary and therefore the output of the aforementioned sensors will vary along with the variation in these operating conditions. Therefore, when performing abnormality detection during the operation of a hydraulic machine, there is a need to include a large variation range in the threshold value for determining abnormalities using the sensor output. As a result, the reliability of the abnormality detection will be poor, so positive predictive notification of pump damage and functions which can predictively prevent this damage cannot be anticipated.

Furthermore, with the device of Japanese Patent Application Laid-open No. 2000-241306, a failure diagnostic mode is provided which fixes operating conditions such as pump discharge flow rate and discharge pressure to a steady level in order to make an accurate detection. However, periodically stopping operation of the hydraulic machine and performing a failure diagnosis is a major burden for the supervisor of a hydraulic machine, and is not desirable. Furthermore, hydraulic machines for work such as construction equipment like hydraulic shovels are machines which are primarily used for work at mines or construction sites, so stopping operation means stopping the mining or construction work, and causes serious economic impact.

Furthermore, the device disclosed in Japanese Patent Application Laid-open No. H8-114183 does not predict pump damage but rather detects strainer abnormalities, and abnormalities are detected by comparing the differential pressure across the strainer to a threshold value. However, with hydraulic pumps, the oil viscosity changes with oil temperature, so abnormalities cannot easily be detected accurately from differential pressure only.

An object of the present invention is to be able to detect pump failure predictors in order to predictively prevent pump failure.

A further object of the present invention is to be able to predictively detect pump failure even though the pump discharge flow rate and discharge pressure vary during operation of the hydraulic pump without stopping operation of the hydraulic machine for diagnosis.

A further object of the present invention is to be able to predictively detect pump failure even though the temperature of the operating oil varies.

A further object of the present invention is to be able to predict the timing of pump failure with greater reliability in order to predictively prevent pump failure.

One aspect of the present invention is a hydraulic machine, comprising: a hydraulic loading device; a hydraulic pump which discharges pressurized operating oil and supplies the operating oil to the hydraulic loading device; a drain filter which captures contaminants included in the operating oil which flows into the drain of the hydraulic pump; a differential pressure sensor which measures the filter differential pressure across the drain filter; an operating status sensor which measures a specified operating status of the hydraulic pump; a data collector which collects time series data of the filter differential pressure and time series data of the operating status from the differential pressure sensor and the operating status sensor; and a representative differential pressure determining unit, which determines a representative differential pressure value which is the representative value of the filter differential pressure under the operating status which meets specified fixed conditions based on the time series data of the operating status and the time series data of the filter differential pressure collected by the data collector, and which output the determined representative differential pressure value.

With this hydraulic machine, representative differential pressure is output under an operating status which meets fixed conditions so by using this representative differential pressure, pump failure predictors can be detected even though operating conditions such as the pump discharge flow rate or discharge pressure vary during operation of the hydraulic pump. There is also no need to interrupt the work of the hydraulic machine for diagnosis.

With this hydraulic machine, a diagnostic unit can also be provided to diagnose the hydraulic pump health based on the representative differential pressure value output by the representative differential pressure determining unit.

In a preferred embodiment, the operating status sensor measures the pressure or flow rate of the pressurized operating oil which is provided to the hydraulic loading device from the hydraulic pump.

Furthermore, in a preferred embodiment, the representative differential pressure determining unit determines a correlative relationship between the operating status and the filter differential pressure based on the time series data of the operating status and the time series data of the filter differential pressure, determine the filter differential pressure correlation value which corresponds to a specified representative operating status value which meets set fixed conditions based on the determined correlative relationship, and utilizes this determined correlation value as the representative differential pressure value.

Furthermore, as an alternate, it is also acceptable for the representative differential pressure determining unit to extract data from the time series data of the filter differential pressure under an operating status which meets fixed conditions, determine the mean or median of the extracted filter differential pressure data, and use the determined mean or median values as the representative differential pressure value.

In a preferred embodiment, the hydraulic pump is a variable capacity pump, and a capacity information output unit which outputs capacity information which correlates to the hydraulic pump capacity is also provided. Furthermore, the representative differential pressure determining unit acquires the time series data of the filter differential pressure and the time series data of the operating status output when the capacity of the hydraulic pump meets specified fixed conditions, and determines the representative differential pressure value based on the acquired time series data of the operating status and the aquired time series data of the filter differential pressure. Therefore, even if the pump capacity varies, the effect will not be large, and the health of the pump can be diagnosed based on the representative differential pressure.

In a preferred embodiment, a temperature sensor which measures the temperature of the operating oil is also provided. Furthermore, the data collector also collects time series data of the oil temperature from the temperature sensor, and the representative differential pressure determining unit uses the time series data of the oil temperature to correct the representative differential pressure value so that the temperature induced variable component included therein is reduced, and output this corrected representative differential pressure value. Therefore, a big effect will not be received even if the temperature changes, and therefore the pump health can be diagnosed based on the representative differential pressure.

The system according to another aspect of the present invention is a hydraulic pump health monitoring system for a hydraulic machine, comprising a hydraulic pump, a drain filter which captures contaminants included in operating oil which flows to a drain of the hydraulic pump, a differential pressure sensor which measures a filter differential pressure across the drain filter, and an operating status sensor which measures a specified operating status of the hydraulic pump. This system comprises a data collector which collects time series data of the filter differential pressure and time series data of the operating status from the differential pressure sensor and the operating status sensor; and a representative differential pressure determining unit which determines a representative differential pressure value which is a representative value of the filter differential pressure under the operating status which meets specified fixed conditions based on the time series data of the operating condition and the time series data of the filter differential pressure collected from the data collector.

In a preferred embodiment, the system also comprises a diagnostic unit which diagnoses the health of the hydraulic pump based on a representative differential pressure value determined by the representative differential pressure determining unit.

In a preferred embodiment, the diagnostic unit collects time series data of the representative differential pressure value from the representative differential pressure determining unit, determines a correlative relationship between the time lapse and an increase of the representative differential pressure based on the collected time series data of the representative differential pressure value, and has a lifespan estimator which estimates the life of the hydraulic pump based on the determined correlative relationship. Therefore, the timing that the pump will fail can be predicted with greater reliability.

In a preferred embodiment, the diagnostic unit collects the time series data of the representative differential pressure value from the representative differential pressure determining unit, determines a correlative relationship over a specified long time period between time lapse and the representative differential pressure based on the collected time series data of the representative differential pressure value, determines a degree of deviation between the determined correlative relationship over the long time period and the representative differential pressure data over a specified recent short time period, and has an abnormality judging unit which judges the existence of an abnormality with the hydraulic pump based on the determined degree of deviation.

According to another aspect of the present invention, a hydraulic pump health monitoring method for a hydraulic pump which discharges pressurized operating oil and supplies the operating oil to a hydraulic loading device, comprises the steps of: collecting time series data of a filter differential pressure across a drain filter of the hydraulic pump; collecting time series data of a specified operating status for the hydraulic pump; determining a representative differential pressure value which is a representative value of the filter differential pressure under the operating status which meets specified fixed conditions based on the collected time series data of the operating status and the collected time series data of the filter differential pressure; and diagnosing the hydraulic pump health based on the determined representative differential pressure value.

The system according to another aspect of the present invention is a hydraulic pump health monitoring system for a hydraulic machine, comprising a hydraulic pump, a drain filter for capturing contaminants included in operating oil which flows to the drain of the hydraulic pump, a differential pressure sensor which measures a filter differential pressure across the drain filter, and an operating status sensor which measures a specified operating status of the hydraulic pump, comprising: a local controller connected to the hydraulic machine; and a central server which is placed in a location separated from the hydraulic machine and which can communicate with the local controller. Furthermore, the local controller of the hydraulic machine comprises: a data collector which collects time series data of the filter differential pressure and time series data of the operation status from the differential pressure sensor and the operating status sensor of the hydraulic machine; a representative differential pressure determining unit which determines a representative differential pressure value which is the representative filter differential pressure value under an operating status which meets specified fixed conditions based on the time series data of the operating status and the time series data of the filter differential pressure collected by the data collector; and a transmission unit which transmits to the server the representative differential pressure value determined by the representative differential pressure determining unit. Furthermore, the central server comprises: a receiving unit which receives the representative differential pressure value from the local controller; and a diagnostic unit which diagnoses the health of the hydraulic machine based on the received representative differential pressure value.

The system according to another aspect of the present invention is the hydraulic pump health monitoring system for a hydraulic machine, comprising a hydraulic pump, a drain filter which captures contaminants included in operating oil which flows to a drain of the hydraulic pump, a differential pressure sensor which measures a filter differential pressure across the drain filter, and a temperature sensor which measures the temperature of the operating oil, comprising: a data collector which collects time series data of the filter differential pressure and time series data of the oil temperature from the differential pressure sensor and the temperature sensor; a correcting unit which uses the time series data of the oil temperature collected by the data collector and corrects the time series data of the filter differential pressure to reduce the temperature induced variable component therein; and a diagnostic unit which diagnoses the health of the hydraulic pump based on the time series data of the filter differential pressure corrected by the correcting unit. With this system, even if the temperature changes, the health of the pump can be diagnosed based on representative differential pressure without being strongly impacted.

The system according to another aspect of the present invention is the hydraulic pump health monitoring system for a hydraulic machine, comprising a hydraulic pump, a drain filter which captures contaminants included in operating oil which flows to a drain of the hydraulic pump, and a differential pressure sensor which measures a filter differential pressure across the drain filter, comprising: a data collector which collects time series data of the filter differential pressure from the differential pressure sensor; a correlative relationship determining unit which determines a correlative relationship between the time lapse and an increase of the filter differential pressure based on the time series data of the filter differential pressure collected by the data collector; and a lifespan estimator which estimates the lifespan of the hydraulic pump based on the correlative relationship determined by the correlative relationship determining unit. With this system, the timing that a pump fails can be predicted with high reliability so the pump failure can be predictively prevented.

The system according to another aspect of the present invention is the hydraulic pump health monitoring system for a hydraulic machine, comprising a hydraulic pump, a drain filter which captures contaminants included in operating oil which flows to a drain of the hydraulic pump, and a differential pressure sensor which measures a filter differential pressure across the drain filter, comprising: a data collector which collects time series data of the filter differential pressure from the differential pressure sensor; a correlative relationship determining unit which determines a correlative relationship between the lapse time over a specified long period of time and the filter differential pressure based on the time series data of the filter differential pressure collected by the data collector; and a judging unit which determines a degree of deviation between the long-term correlative relationship determined by the correlative relationship determining unit and the filter differential pressure data over a specified recent short period of time, and estimate the lifespan or judge the existence of hydraulic pump abnormalities based on the determined degree of deviation. With this system, pump failure predictors can be detected beforehand or the timing that the pump will fail can be predicted, with a high level of reliability.

BRIEF DESCRIPTION OF THE DRAWINGS

FIG. 5 is a diagram which describes in detail the contents of processing performed by the PHMS controller 18.

DESCRIPTION OF THE PREFERRED EMBODIMENTS

Figure 1:
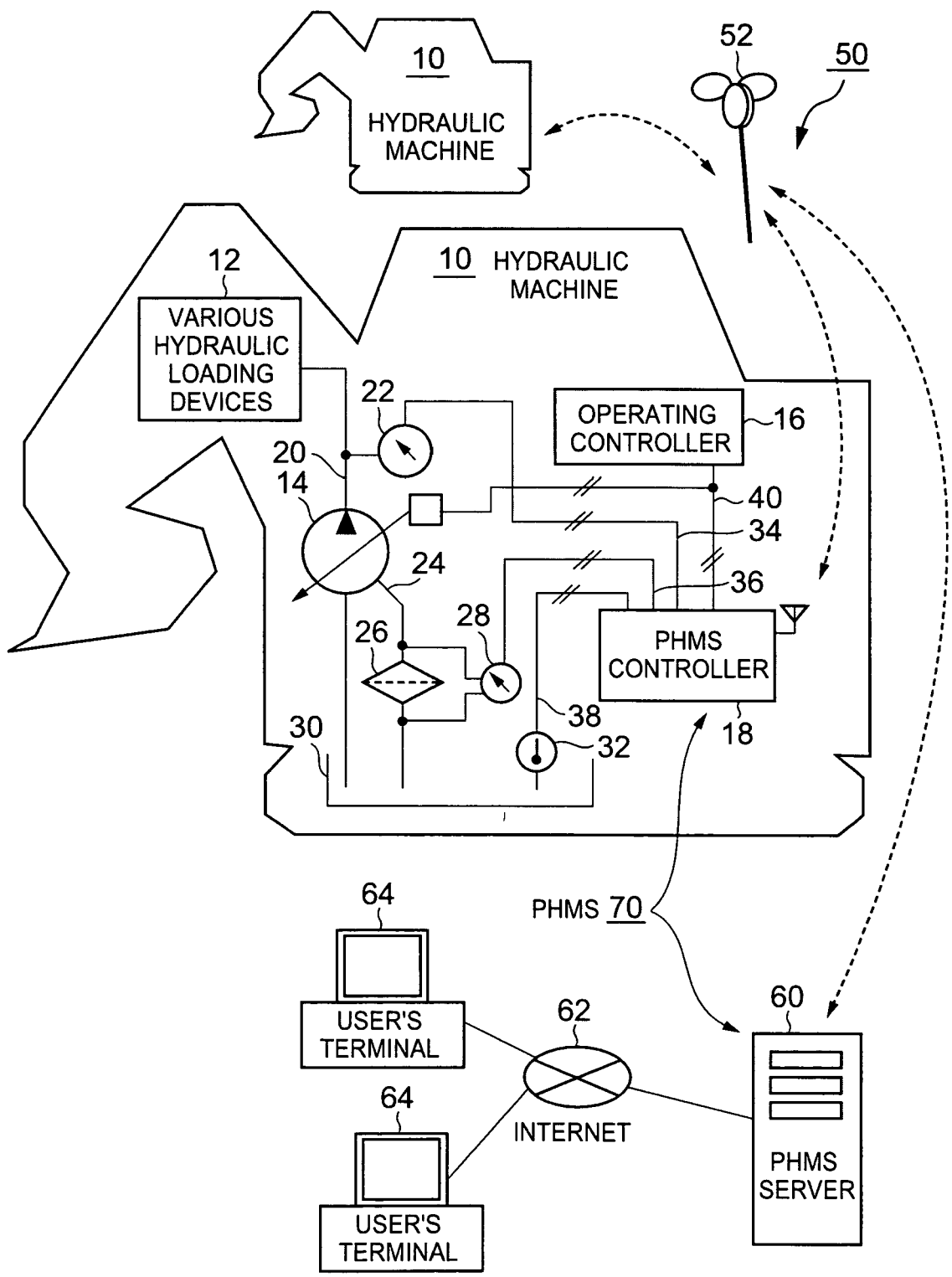
FIG. 1 is a block line diagram showing the overall structure of a preferred embodiment of the hydraulic machine and hydraulic pump health monitoring system of the present invention.

FIG. 1 shows the overall structure of an embodiment of the hydraulic machine and hydraulic pump health monitoring system of the present invention.

As shown in FIG. 1, a hydraulic machine 10 such as construction equipment has various hydraulic loading devices 12 (such as actuators like hydraulic motors and cylinders) which operate by hydraulic pressure, a hydraulic pump 14 for supplying pressurized operating oil to these hydraulic loading devices 12, and an operating controller 16 which issues commands for operating and controlling these hydraulic loading devices 12 and hydraulic pump 14. The hydraulic pump 14 may be either a fixed capacity type or a variable capacity type. However, in this embodiment the hydraulic pump is a swash plate pump which is a type of variable capacity pump. Capacity instructions 40 controlling the capacity of the hydraulic pump to a desired target value are given to the hydraulic pump 14 from the operating controller 16 as an instruction for operation and control. With this embodiment, these capacity instructions are swash plate angle commands for controlling the swash plate angle of the swash plate pump 14 to the desired target angle.

Furthermore, the hydraulic machine 10 has a local controller 18 for collecting and processing hydraulic pump 14 status data. This local controller 18 is able to communicate with a central server 60 located, for instance, at a distant location via a wireless mobile communication web 50 which uses a communication satellite 50. Local controller 18 collects the status data of the hydraulic pump 14 and periodically transmits (for instance in 20 hour increments) processed result data to the central server 60. Central server 60 accumulates the data received from the local controller 18 and diagnoses the health (such as the presence of failure predictors, estimated lifespan, or the like) of the hydraulic pump 14 in the remote hydraulic machine 10. The local controller 18 and the central server 60 together make up the hydraulic pump 14 health monitoring system 70. Hereinafter, this system 70 is abbreviated as "PHMS (Pump Health Monitoring System)", and the local controller 18 and the central server 60 are referred to as the "PHMS controller" and the "PHMS server" respectively.

As shown in FIG. 1, a plurality of hydraulic machines 10, 10, . . . exists in different locations, but each of the plurality of hydraulic machines 10, 10, . . . can contain an aforementioned PHMS controller 18. The PHMS server 60 is able to communicate with each of the PHMS controllers 18 in the plurality of hydraulic machines 10, 10, . . . , and can diagnose the health of each of the hydraulic pumps 14 in the plurality of hydraulic machines 10, 10, . . . . The PHMS server 60 is able to communicate with terminal computers (Hereinafter referred to as "user's terminal") 64, 64, . . . used by the users of the hydraulic machines 10, 10, . . . via a communication web between computers 62 such as the Internet. The PHMS server 60 is able to always provide in real-time to the user's terminal 64 the health diagnostic results (such as warning data that hydraulic pump 14 failure predictors have appeared or lifespan data showing the estimated lifespan, or the like) of the hydraulic pump 14 in the hydraulic machine 10 of the user. Therefore, each user can know the health diagnostic results of the hydraulic pump 14 of the hydraulic machine 10 even when at the office or home, no matter the location of the hydraulic machine 10 being supervised. Note, PHMS 70 can collect to the PHMS server 60 and provide in real-time to the user's terminal 64 not just the health diagnostic results of the hydraulic pump 18, but also various other conditions of the hydraulic machine 10 (such as current location, cumulative operating hours (service meter record value), engine temperature, remaining fuel, battery status, or the like), but a description of this point is omitted from this document.

In each of the hydraulic machines 10, a pressure sensor 22 for measuring the hydraulic pressure of the hydraulic operating oil is provided in the pressurized operating oil line 20 for supplying pressurized operating oil that is discharged from the hydraulic pump 14 to the hydraulic loading device 12. In the present invention, an object of measuring the hydraulic pressure of the pressurized operating oil by the pressure sensor 22 is to use this measured oil pressure for correction processing performed by the PHMS controller 18 in order to eliminate the variable component (plugging, error component) of the differential pressure caused by variation in the drain flow rate from the drain filter differential pressure measured value which is a health parameter of the hydraulic pump 14, as will be described later. In this embodiment, the pressure sensor 22 is placed near the discharge port of the hydraulic pump 14 and measures the discharge pressure from the hydraulic pump 14. Considering the aforementioned object, it would seem obvious that measuring the discharge flow rate rather than the discharge pressure would be preferable. This is because the flow rate of the drain is directly affected by the discharge flow rate. However, measuring the discharge pressure, as in this embodiment, rather than the discharge flow rate has the following advantages. First, a pressure sensor 22 which measures the discharge pressure is normally provided on hydraulic pumps 14 for reasons other than the present invention, so the use can be diverted to meet this object of the present invention. Secondly, pressure sensors are less expensive than flow rate sensors. Thirdly, according to tests by the inventors, there is a near linear correlative relationship between the discharge pressure and the drain filter differential pressure, so the aforementioned correction process can easily be accomplished by using the near linear discharge pressure-filter differential pressure correlative relationship. Because of these advantages, in this embodiment, the discharge pressure is measured by pressure sensor 22. The discharge pressure measurement value 34 which is output from the pressure sensor 22 is sent to the PHMS controller 18. Note, from the aforementioned object, it is not absolutely necessary that the discharge pressure be measured, and detecting any operating condition of the hydraulic pump which has an affect on the flow rate of the operating oil in the drain is acceptable, so measuring the hydraulic pressure of locations other than the discharge port (such as providing a pressure sensor 22 at a specified hydraulic loading device (such as a hydraulic motor) 12 and measuring the hydraulic pressure supplied to that hydraulic loading device 12) is acceptable, and measuring the discharge flow rate or the drain flow rate is also acceptable.

The drain 24 of hydraulic pump 14 has a drain filter 26 for capturing by a strainer contaminants included in the operating oil which flow therethrough. The drain filter 26 is connected to a differential pressure sensor 28 for measuring the differential pressure of the operating oil across the drain filter 26 (before and after the strainer) (Hereinafter referred to as the "filter differential pressure"). The filter differential pressure measured value 36 which is output from the differential pressure sensor 28 is received by the PHMS controller 18. The filter differential pressure across the drain filter 26 can be used as a main barometer for diagnosing the health of the hydraulic pump 14. This is because a direct factor of pump failures in hydraulic pumps such as swash plate pumps is wearing of the shoe, and the metal powder generated by shoe wear is captured by and accumulates in the drain filter 26, so the filter differential pressure will increase along with the progression of shoe wear.

However, the filter differential pressure is not only because of captured metal particles, but because of other factors as well. The main factors include operating oil flow rate through the drain 24, operating oil temperature, and hydraulic pump 14 capacity. By removing the variable components dependent on these factors from the filter differential pressure measured value 34, the pressure differential component dependent on the quantity of captured metal particles can be extracted. In order to correct by removing the variable component of the differential pressure dependent on the flow rate through drain 24, the discharge pressure measured value 34 from the pressure sensor 22 is sent to the PHMS controller 18 as described above. Furthermore, in order to correct by removing the variable component of the differential pressure dependent on the temperature of the operating oil, a temperature sensor 32 is provided in an oil tank 30, and the measured temperature value 38 output from the temperature sensor 32 is sent to the PHMS controller 18. Furthermore, in order to correct by removing the differential pressure variable component dependent on the hydraulic pump 14 capacity, the swash plate angle command 40 (showing the swash plate angle or capacity of the hydraulic pump) output from the operating controller 16 is sent to the PHMS controller 18.

The PHMS controller 18 receives the discharge pressure measured value 34, the filter differential pressure measured value 36, the oil temperature measured value 38, and the swash plate angle command 40 from the pressure sensor 22, the differential pressure sensor 28, the temperature sensor 32, and the operating controller 16, respectively, and converts and records this input data as digital data. The operation of inputting and recording these measured values is intermittently performed at short specified time intervals at least while the hydraulic pump 14 is operating. Therefore, PHMS controller 18 will accumulate time series data for the discharge pressure, filter differential pressure, oil temperature, and swash plate angle measured over a plurality of points in time from the past to the present. PHMS controller 18 will use this time series data to calculate by methods to be discussed later an expected value (essentially the differential pressure component dependent only on the quantity of metal particles captured with the variable components dependents on the above factors removed) for the filter differential pressure which would likely be obtained if the aforementioned differential pressure variation factors meet specified fixed conditions, and this expected value is transmitted to the PHMS server 60. The calculation and transmission of the expected value for the filter differential pressure is intermittently performed at, for instance, 20 hour intervals. Therefore, the PHMS server 60 will accumulate time series data of the expected value of the filter differential pressure. The PHMS server 60 will diagnose the health such as the lifespan and presence of hydraulic pump 14 failure predictors based on the time series data of the expected value of this filter differential pressure.

Figure 2:
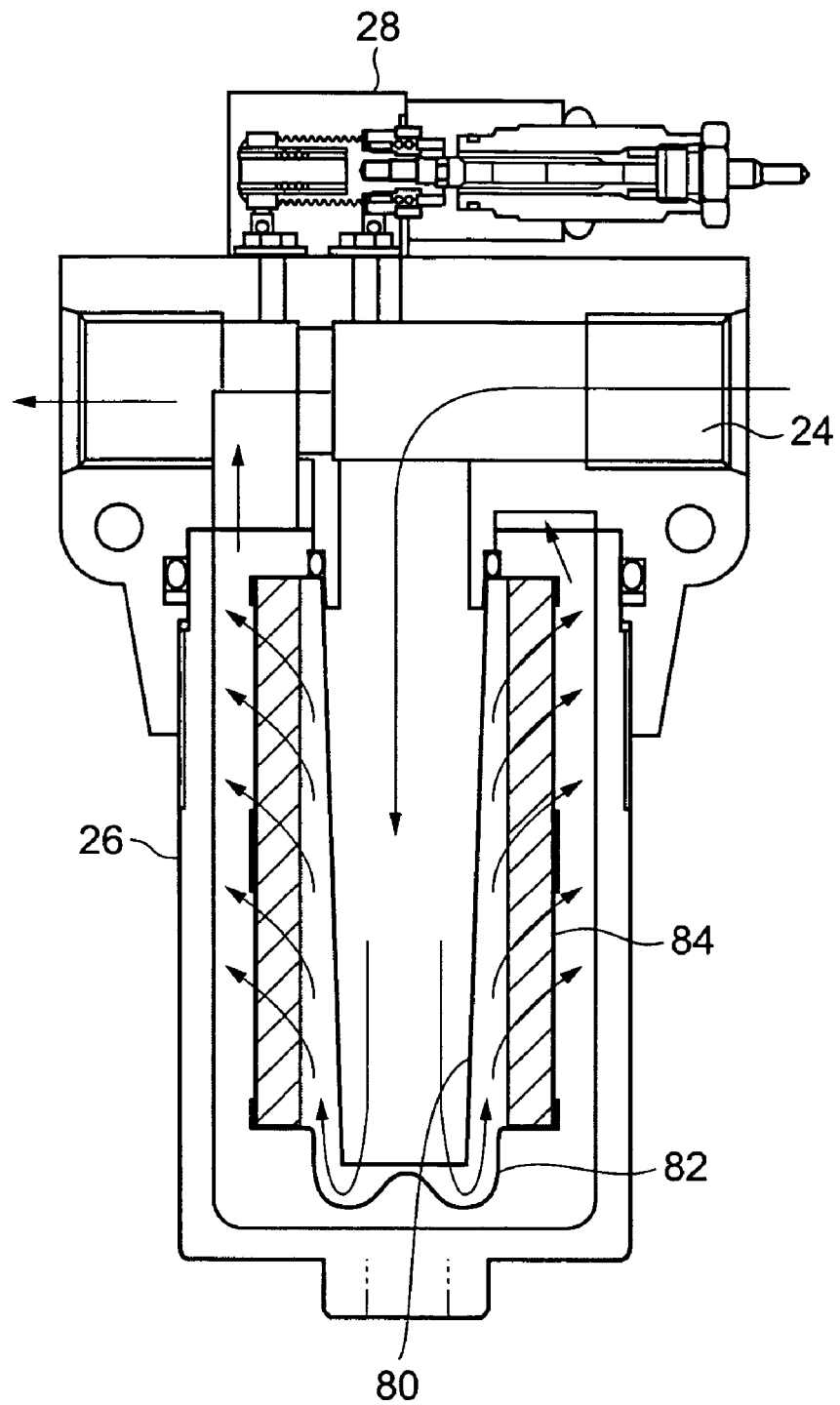
FIG. 2 is a cross-section diagram showing an example of a drain filter 26 structure which uses this preferred embodiment.

FIG. 2 is a cross-section view showing an example of a drain filter 26 structure which uses this embodiment.

This drain filter 26 is positioned such that the top part shown in the figure is actually to the top and the bottom part is to the bottom. The operating oil flow which flows into the drain filter 26 from the drain 24 is first guided to the bottom inside part of a cylindrical strainer 84 by flow guides 80, 82 which are established in the drain filter 26, and then made to rise upward from the bottom and pass from the inside of the strainer 84 to the outside. Most of the metal particles included in the operating oil will not settle and accumulate in the bottom part of the drain filter 26, but will be captured in the strainer 84 because the rising current of operating oil will pass through from the inside to the outside of the strainer 84. Moreover, the quantity of metal particles captured in the strainer 84 will be nearly consistent across the whole region of the strainer 84. As a result, there will be a high correlation function between the amount of captured metal particles (in other words the degree of wear of the hydraulic pump 14) and the filter differential pressure before and after the strainer 84 which is measured by the differential pressure sensor 28. Therefore, the reliability of the filter differential pressure as a barometer of hydraulic pump 14 health will be high.

The PHMS controller 18 and the PHMS server 60 will be described below in detail.

Figure 3:
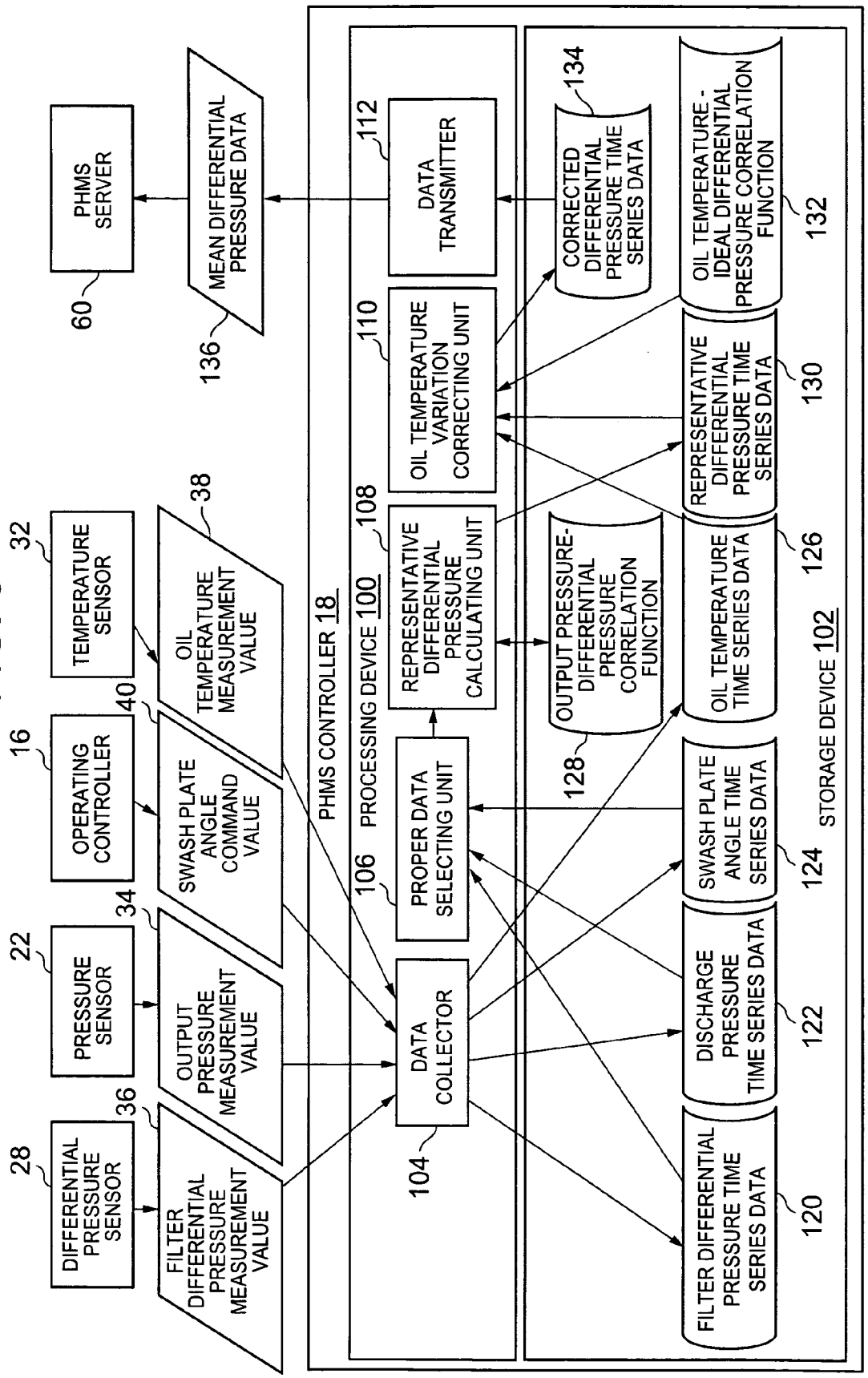
FIG. 3 is a block line diagram showing the structure and function of a PHMS controller 18.
Figure 4:
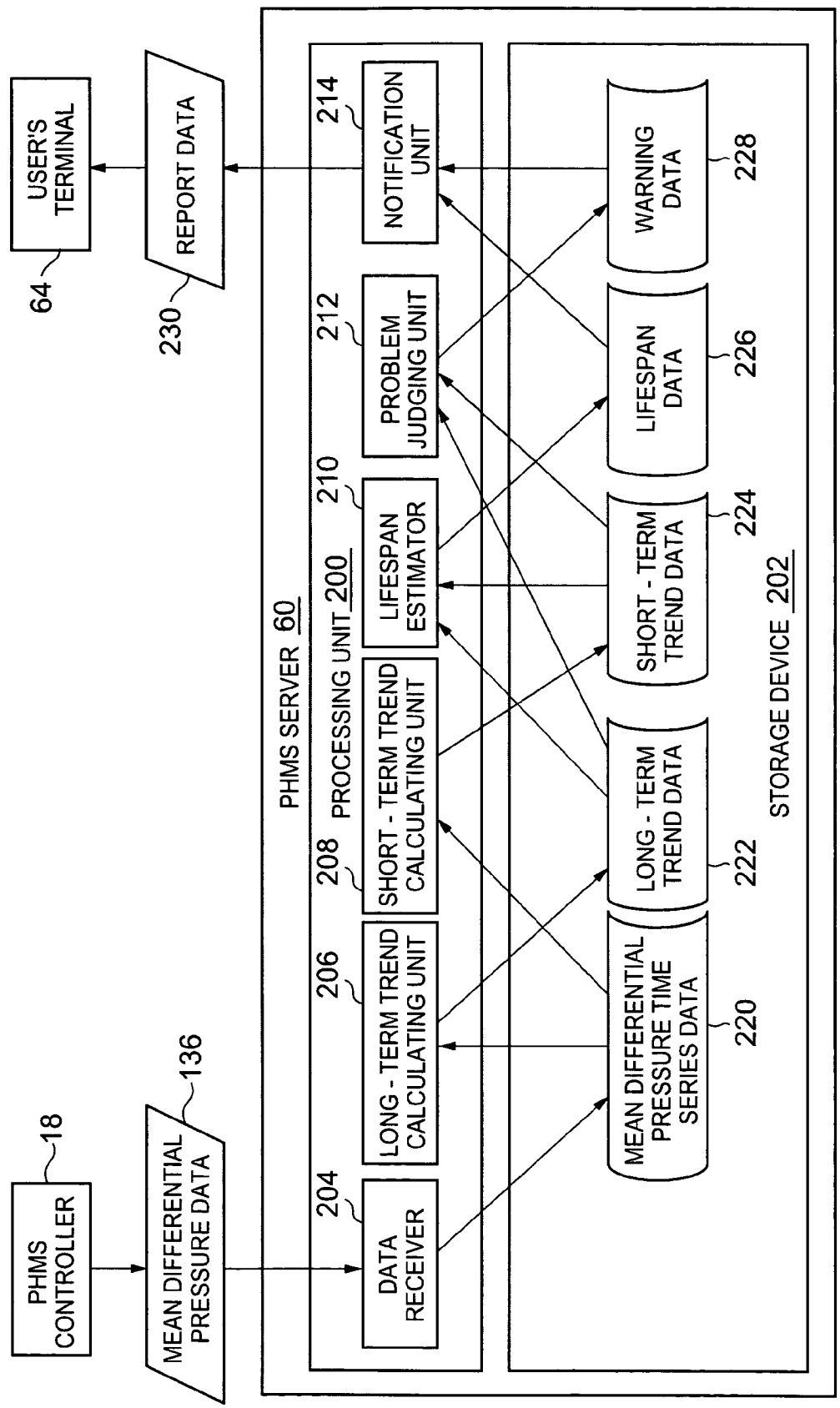
FIG. 4 is a block line diagram showing the structure and function of a PHMS server 60.
Figure 6:
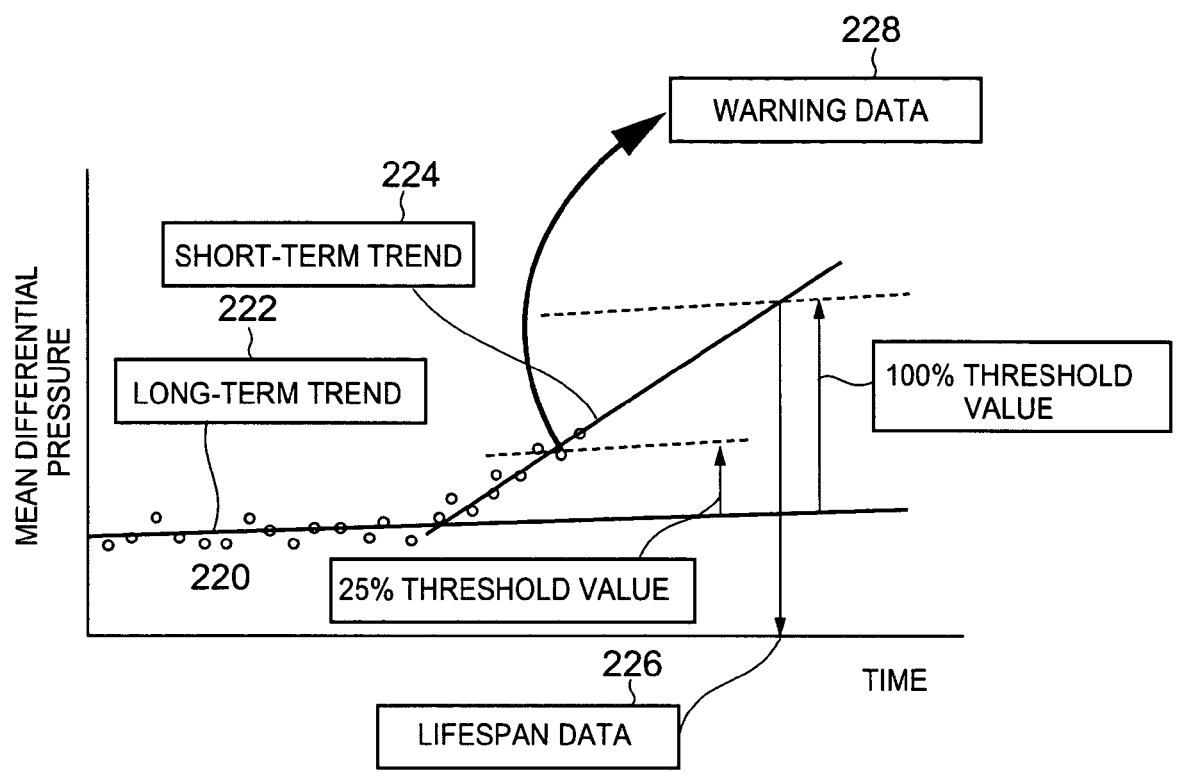
FIG. 6 is a diagram which describes in detail the contents of processing performed by the PHMS server 60.

FIG. 3 shows the structure and function of the PHMS controller 18. FIG. 4 shows the structure and function of the PHMS server 60. FIG. 5 specifically describes the process performed by the PHMS controller 18. FIG. 6 specifically describes the process performed by the PHMS server 60.

As shown in FIG. 3, PHMS controller 18 has a processing device 100 and a storage device 102. The processing device 100 has a data collector 104, a proper data selecting unit 106, a representative differential pressure calculator 108, an oil temperature variation correcting unit 110, and a data transmitter 112. As shown in FIG. 4, the PHMS server 60 has a processing device 200 and a storage device 202. The processing device has a data receiver 204, a long-term trend calculating unit 206, a short-term trend calculating unit 208, a lifespan estimator 210, an abnormality judging unit 212, and a notification unit 214. The PHMS controller 18 and the PHMS server 60 both have a programmed computer and a hardware wired circuit, or a combination of these.

The function and action of the PHMS controller 18 will be described below while referring to FIG. 3 and FIG. 5.

As shown in FIG. 3, the data collector 104 intermittently collects at specified short intervals the filter differential pressure measurement value 36 from the differential pressure sensor 28, the discharge pressure measurement value 34 from the pressure sensor 22, the swash plate angle command value 40 from the operating controller 16, and the oil temperature measurement value 38 from the temperature sensor 32, converts the collected measurement values to digital data, and stores this digital data in the storage device 102. Therefore, the time series data 120, 122, 124, 126 of the filter differential pressure, discharge pressure swash plate angle, and oil temperature measured over a plurality of time points from the past to the present will be accumulated in the storage device 102. FIG. 5A shows an example of the filter differential pressure time series data 120, the discharge pressure time series data 122, the swash plate angle time series data 124, and the oil temperature time series data 126. These time series data 120, 122, 124, 126 include the respective measurement value data together with the time series data showing the measurement time. The filter differential pressure, the discharge pressure, the swash plate angle, and the oil temperature measurement data which are included in the time series data 120, 122, 124, 126 mutually correlate so that the measurement times shown by the time series data are the same.

Referring again to FIG. 3, the proper data selecting unit 106 identifies the time period that the swash plate angle meets specified fixed conditions during a specified time period from the past to the present based on the swash plate angle time series data 124, and extracts only the discharge pressure data and the filter differential pressure data measured during this time period from the filter differential pressure time series data 120 and the discharge pressure time series data 122. In this document, the specified fixed condition for the swash plate angle is defined as either the swash plate angle being at one specified angle, or being within a specified narrow angular range centered around one specified angle. The aforementioned one specified angle may be the representative swash plate angle most frequently used in the hydraulic machine 10.

FIG. 5A and FIG. 5B show specific examples of the processing by the proper data selecting unit 106. Of the swash plate angle time series data 124 shown in FIG. 5A, the section enclosed by the broken line shows the case where the swash plate angle meets fixed conditions during the aforementioned specified time period. FIG. 5B shows a plot of all filter differential pressure and discharge pressure measurement value data during the aforementioned specified time period which are include in the filter differential pressure time series data 120 and the discharge pressure time series data 122, on a filter differential pressure-discharge pressure coordinate plane. Each plot shows the filter differential pressure and discharge pressure corresponding to the same measurement time. The proper data selecting unit 106 extracts the data where the swash plate angle meets fixed conditions, or in other words, only the plots within the region enclosed by the broken line, from all of the filter differential pressure and discharge pressure data during the specified time period shown in FIG. 5B. Therefore, only the measured value data when the swash plate angle (or in other words the pump capacity) meets fixed conditions is extracted, so the filter differential pressure variability factor which is dependent on the pump capacity can be removed from or minimized in the post-extraction data.

Refer again to FIG. 3. The representative differential pressure calculating unit 108 receives filter differential pressure and discharge pressure measurement value data which was extracted by the proper data selecting unit 106, and based thereon, calculates a filter differential pressure (Hereinafter referred to as "representative differential pressure") for the case where the discharge pressure meets specified fixed conditions. In this document, specified fixed conditions for the discharge pressure is defined as either the discharge pressure being at a single specified pressure or being within a specified pressure range and centered around a specified single pressure value. The aforementioned specified single pressure value can for instance be the representative discharge pressure value (such as 150 kg/cm$^2$) which is most frequently used for the hydraulic machine 10. A variety of methods can be used as the representative differential pressure calculation method, but in this embodiment, the representative differential pressure calculating unit 108 determines a correlation function 128 between the discharge pressure and the filter differential pressure, and determines the representative differential pressure based on this correlation function. FIG. 5C specifically shows this method. As shown in FIG. 5C, the representative differential pressure calculating unit 108 first calculates a correlation function 128 between the discharge pressure and filter differential pressure based on the filter differential pressure and discharge pressure measurement value data (plots in region enclosed by broken line in FIG. 5B) extracted by the proper data selecting unit 106. At this time, a first-degree function (linear function) can be used as the correlation function. Linear functions can be determined by two coefficients so the calculation is simple. Furthermore, according to research by the inventors, a strong linear correlation function exists between the filter differential pressure and the discharge pressure, so the use of a linear function as the correlation function is reasonable. Furthermore, representative differential pressure calculating unit 108 calculates a filter differential pressure value corresponding to the aforementioned representative discharge pressure value (at specified fixed conditions) or in other words a representative differential pressure value as shown in FIG. 5C based up on the determined correlation function 128. The filter differential pressure variable component which is dependent on the drain flow rate is not included or is minimized in this representative differential pressure value.

Note, it is also acceptable to determine the representative differential pressure value from the following simple method in place of the method of determining the aforementioned discharge pressure—filter differential pressure correlation function 128. Only the filter differential pressure measurement value data corresponding to the discharge pressure measurement value data which meets the aforementioned fixed conditions is extracted and the mean or median of this extracted filter differential pressure measurement value data is calculated to obtain the representative differential pressure value. This method is appropriate for pumps with small discharge pressure variation. On the other hand, the method of determining the representative differential pressure using the aforementioned discharge pressure—filter differential pressure correlation function 128 is appropriate for pumps with large discharge pressure variation.

As shown in FIG. 3, the representative differential pressure calculating unit 108 stores the calculated representative differential pressure in the storage device 102. The processing of the aforementioned proper data selecting unit 106 and representative differential pressure calculating unit 108 will be repeatedly and intermittently performed at short intervals. Therefore, the storage device 102 will accumulate representative differential pressure time series data 130 at many points in time from the past to the present.

As shown in FIG. 3, the temperature variation correcting unit 110 receives the oil temperature time series data 126 and the representative differential pressure time series data 130 for a specified time period from the past to the present, and corrects the representative differential pressure time series data 130 using the oil temperature time series data 126, and removes or minimizes the filter differential pressure variable component which is dependent on the oil temperature, from the representative differential pressure time series data 130. In order to perform this correction, in this embodiment, the oil temperature variable correcting unit 110 corrects the representative differential pressure value data by subtracting the ideal differential pressure for the corresponding oil temperature based on an oil temperature—ideal differential pressure correlation function 132 from the representative differential pressure value data included in the representative differential pressure time series data 130 using an oil temperature—ideal differential pressure correlation function 132 prepared beforehand. In this document, the oil temperature—ideal differential pressure correlation function 132 is defined as the function which expresses the correlative relationship between the oil temperature and the ideal filter differential pressure (ideal differential pressure) for the case where absolutely no metal particles are retained in the drain filter 26, and may be empirically determined for instance.

FIG. 5D specifically shows the oil temperature correction processing performed by the oil temperature variation correcting unit 110. The horizontal axis shown in FIG. 5D shows the average oil temperature for each specified unit of time (such as one minute) over the time period of the representative differential pressure time series data 130. The oil temperature variation correcting unit 110 calculates this average oil temperature based on the oil temperature time series data 126. Furthermore, the oil temperature variable correcting unit 110 calculates the ideal differential pressure corresponding to the calculated average oil temperature using the discharge pressure—ideal differential pressure correlation function 132 prepared beforehand. Furthermore, the oil temperature variable correcting unit 110 corrects the representative differential pressure value data by subtracting the ideal differential pressure corresponding to the same oil temperature from all of the representative differential pressure value data included in the representative differential pressure time series data 130. In other words, the corrected representative differential pressure value (corrected differential pressure) data expresses the difference between the original representative differential pressure value and the ideal differential pressure corresponding thereto. FIG. 5D shows an arrow pointing towards the representative differential pressure value plot from the line of the discharge pressure—ideal differential pressure correlation function 132. As is clear from the above descriptions, the corrected differential pressure data has a strong correlative relationship to the amount of metal particles captured in the drain filter 26 (or in other words the level of wearing by the hydraulic pump 14) because the filter differential pressure variable component which is dependent on the drain flow rate and oil temperature is eliminated or minimized. Therefore, a health diagnosis with high reliability is possible by using the corrected differential pressure data as a barometer for measuring the health of a hydraulic pump 14.

As shown in FIG. 3, the oil temperature variation correcting unit 110 stores the calculated correction differential pressure in the storage device 102. The aforementioned oil temperature variation correcting part 110 is intermittently and repeatedly performed over a short time interval. Therefore, the storage device 102 will accumulate the corrected differential pressure time series data 134 for many points in time from the past until the present.

As shown in FIG. 3 and FIG. 5E, the data transmitter 112 calculates the corrected differential pressure value data mean value (mean differential pressure) during the most recent specified time period (such as 20 hours) included in the corrected differential pressure time series data 134, and periodically (such as every 20 hours) transmits this mean differential pressure data 136 to the PHMS server 60.

The function and operation of the PHMS server 60 will be described below while referring to FIG. 4 and FIG. 6.

As shown in FIG. 4, the data receiver 204 of the PHMS server 60 periodically (such as every 20 hours) receives mean differential pressure data 136 from the PHMS controller 18, and stores this data in the storage device 202. Therefore, mean differential pressure time series data 220 from many points in time such as every 20 hours from the past to the present will be collected in the storage device 202. In FIG. 6, mean differential pressure time series data 220 is expressed as a plurality of plots on a mean differential pressure—time coordinate plane.

As shown in FIG. 4, the long-term trend calculating unit 206 calculates long-term trend data 222 which expresses the increasing trend of the mean differential pressure time series data 220 over time for a specified long period of time (such as the most recent several months, year, or even longer periods of time) based on the mean differential pressure time series data 220. The long-term trend data is for instance a linear function. This long-term trend data 222 expresses the phenomenon that the filter differential pressure will increase as the drain flow rate gradually increases even though the discharge pressure is identical, and is the cause of loosening and rattling or the like of the equipment over the long-term, and this is the component to be removed from the filter differential pressure where the filter differential pressure is used to determine the progression of wear of the oil pump 14.

As shown in FIG. 4, the short term trend calculating unit 208 calculates short term trend data 224 which expresses the trend of the mean differential pressure time series data 220 to increase over time during a specified short period of time (such as the most recent 10 days) based on the mean differential pressure time series data 220. This short term trend data 224 is for instance a linear function. The progression of the wear of the hydraulic pump 14 can be determined by the degree of deviation of the short term trend data 224 from the long-term trend data 222.

As shown in FIG. 4, the lifespan estimator 210 calculates the degree of deviation of the short-term trend data 224 from the long-term trend data 222, and based thereon, estimates the lifespan of the hydraulic pump 14. For instance, as shown in FIG. 6, the degree of deviation where the hydraulic pump 14 fails (such as when the swash plate pump shoe is 100% worn) can be empirically determined beforehand, and this value is already set beforehand for the PHMS server 60 at a threshold value of 100%. As shown in FIG. 6, the lifespan estimator 210 extends the line of the short-term trend data 224 and the long-term trend data 222 mean to the future, and determines the point in time when the degree of deviation of both of these data achieve the 100% threshold value, and this point in time is the lifespan data 226 which shows the predicted time of failure in the future for the hydraulic pump 14. Alternately, as shown in FIG. 6, the degree of deviation when the hydraulic pump 14 reaches a certain level of wear (such as 25% wear of the swash plate pump shoe), is empirically determined, and this level is set beforehand for the PHMS sever 60 at a threshold value of 25%. The lifespan estimator 210 sets the lifespan data 226 to the point in time where the remaining life span which is empirically determined beforehand (such as 50 days) is added to the point where the degree of deviation of the short-term trend data 224 from the long-term trend data 222 reaches a threshold value of 25%.

As shown in FIG. 4, an abnormality judging unit 212 calculates the degree of deviation of the short-term trend data 224 from the long-term trend data 222, and based thereon, determines whether or not there are predictors of hydraulic pump 14 failure, and if predictors are detected, outputs warning data 228. For instance, if the degree of deviation of the short-term trend data 224 from the long-term trend data 222 reaches a level just prior to failure, such as the specified threshold value of 25%, the abnormality judging unit 212 will issue warning data 228 showing that failure is near.

As shown in FIG. 4, a notification unit 228 transmits notification data 230 which includes the lifespan data 226 and the warning data 228 to the user's terminal 64.

An embodiment of the present invention has been described above, but this embodiment is only an example for describing the present invention, and does not restrict the scope of the present invention to just this embodiment. The present invention may be performed with other various embodiments so long as the gist of the present invention is not deviated.

For instance, all of these hydraulic pump health monitoring diagnostic functions contained in the PHMS controller 18 and the PHMS server 60 in the aforementioned embodiment can be included in each of the hydraulic machines 10, or the function of the PHMS controller 18 can be contained in a unit external to the hydraulic machine 10 such as the PHMS server 60.

What is claimed is:

1. A hydraulic machine, comprising:
   a hydraulic loading device;
   a hydraulic pump which discharges pressurized operating oil and supplies the operating oil to said hydraulic loading device;
   a drain filter which captures contaminants included in the operating oil which flows into the drain of said hydraulic pump;
   a differential pressure sensor which measures a filter differential pressure across said drain filter;
   an operating status sensor which measures a specified operating status of said hydraulic pump;
   a data collector which collects time series data of said filter differential pressure and time series data of said operating status from said differential pressure sensor and said operating status sensor; and
   a representative differential pressure determining unit which determines a representative differential pressure value which is the representative value of said filter differential pressure under said operating status which meets specified fixed conditions based on said time series data of said operating status and said time series data of said filter differential pressure collected by said data collector, and which output said determined representative differential pressure value.

2. The hydraulic machine according to claim 1, further comprising a diagnostic unit which diagnoses the health of said hydraulic pump based on said representative differential pressure value output from said representative differential pressure determining unit.

3. The hydraulic machine according to claim 1 or claim 2, wherein said operating status sensor measures as said operating status the pressure or flow of said pressurized operating oil which is supplied to said hydraulic loading device from said hydraulic pump.

4. The hydraulic machine according to claim 1 or claim 2, wherein said representative differential pressure determining unit determines the correlative relationship between said operating status and said filter differential pressure based on said time series data of said operating status and said time series data of said filter differential pressure, determine a correlation value of said filter differential pressure corresponding to a single specified representative of said operating status value which meets said fixed conditions based on said determined correlative relationship, and utilizes said determined correlation value as said representative differential pressure value.

5. The hydraulic machine according to claim 1 or claim 2, wherein said representative differential pressure determining unit extracts data under said operating status which meets said fixed conditions from said time series data of said filter differential pressure, determines the mean or median value of said extracted filter differential pressure data, and utilizes said determined mean or median value as said representative differential pressure value.

6. The hydraulic machine according to claim 1 or claim 2, wherein said hydraulic pump is a variable capacity pump, a capacity information outputting unit which outputs capacity information which correlates to said hydraulic pump capacity is further provided, and said representative differential pressure determining unit acquires said time series data of said operating status and said time series data of said filter differential pressure measured when said hydraulic pump capacity meets specified fixed conditions based on said capacity information and determine said representative differential pressure value based on said acquired time series data of said operating status and said acquired time series data of filter differential pressure.

7. The hydraulic machine according to claim 1 or claim 2, further comprising a temperature sensor for measuring the temperature of said operating oil, said data collector also collects time series data of said oil temperature from said temperature sensor, and said representative differential pressure determining unit uses said time series data of said oil temperature to correct said representative differential pressure value by reducing the oil temperature induced variable component included therein, and outputs said corrected representative differential pressure value.

8. A hydraulic pump health monitoring system for a hydraulic machine, comprising a hydraulic pump, a drain filter which captures contaminants included in operating oil which flows to a drain of said hydraulic pump, a differential pressure sensor which measures a filter differential pressure across said drain filter, and an operating status sensor which detects a specified operating status of said hydraulic pump, comprising:
   a data collector which collects time series data of said filter differential pressure and time series data of said operating status from said differential pressure sensor and said operating status sensor; and
   a representative differential pressure determining unit which determinea a representative differential pressure value which is a representative value of said filter differential pressure under said operating status which meets specified fixed conditions based on said time series data of said operating condition and said time series data of said filter differential pressure collected from said data collector.

9. The hydraulic pump health monitoring system according to claim 8, further comprising a diagnostic unit which diagnoses the health of said hydraulic pump based on said representative differential pressure value determined by said representative differential pressure determining unit.

10. The hydraulic pump health monitoring system according to claim 9 wherein said diagnostic unit collects time series data of said representative differential pressure value from said representative differential pressure determining unit, determines a correlative relationship between time lapse and an increase of said representative differential pressure based on said collected time series data of said representative differential pressure value, and has a lifespan estimator which estimates a life span of said hydraulic pump based on said determined correlative relationship.

11. The hydraulic pump health monitoring system according to claim 9 wherein said diagnostic unit collects time series data of said representative differential pressure value from said representative differential pressure determining unit, determines a correlative relationship over a specified long time period between time lapse and said representative differential pressure based on said collected time series data of said representative differential pressure value, determines a degree of deviation between said determined correlative relationship over said long time period and said representative differential pressure data over a specified recent short time period, and has an abnormality judging unit which judges abnormalities with said hydraulic pump based on said determined degree of deviation.

12. A hydraulic pump health monitoring method for a hydraulic pump which discharges pressurized operating oil and supplies the operating oil to a hydraulic loading device, comprising the steps of:
 collecting time series data of a filter differential pressure across a drain filter of said hydraulic pump;
 collecting time series data of a specified operating status for said hydraulic pump;
 determining a representative differential pressure value which is a representative value of said filter differential pressure under said operating status which meets specified fixed conditions based on said time series data of said collected operating status and said time series data of said filter differential pressure; and
 diagnosing said hydraulic pump health based on said determined representative differential pressure value.

13. A hydraulic pump health monitoring system for a hydraulic machine, comprising a hydraulic pump, a drain filter for capturing contaminants included in operating oil which flows to a drain of said hydraulic pump, a differential pressure sensor which measures a filter differential pressure across said drain filter, and an operating status sensor which detects a specified operating status of said hydraulic pump, comprising:
 a local controller connected to said hydraulic machine; and
 a central server which is placed in a location separated from said hydraulic machine and which can communicate with said local controller;
 said local controller of said hydraulic machine comprising:
 a data collector which collects time series data of said filter differential pressure and time series data of said operation status from said differential pressure sensor and said operating status sensor of said hydraulic machine;
 a representative differential pressure determining unit which determines a representative differential pressure value which is said representative filter differential pressure value under said operating status which meets specified fixed conditions based on said time series data of said operating status and said time series data of said filter differential pressure collected by said data collector; and
 a transmission unit which transmits to said server said representative differential pressure value determined by said representative differential pressure determining unit;
 said central server comprising:
 a receiving unit which receives said representative differential pressure value from said local controller; and
 a diagnostic unit which diagnoses the health of said hydraulic machine based on said received representative differential pressure value.

14. A hydraulic pump health monitoring system for a hydraulic machine, comprising a hydraulic pump, a drain filter which captures contaminants included in operating oil which flows to a drain of said hydraulic pump, a differential pressure sensor which measures a filter differential pressure across said drain filter, and a temperature sensor which measures the temperature of said operating oil, comprising:
 a data collector which collects time series data of said filter differential pressure and time series data of said oil temperature from said differential pressure sensor and said temperature sensor;
 a correcting unit which uses said time series data of said oil temperature collected by said data collector and corrects said time series data of said filter differential pressure to reduce the temperature induced variable component therein; and
 a diagnostic unit which diagnoses the health of said hydraulic pump based on said time series data of said filter differential pressure corrected by said correcting unit.

15. A hydraulic pump health monitoring system for a hydraulic machine, comprising a hydraulic pump, a drain filter which captures contaminants included in operating oil which flows to a drain of said hydraulic pump, and a differential pressure sensor which measures a filter differential pressure across said drain filter, comprising:
 a data collector which collects time series data of said filter differential pressure from said differential pressure sensor;
 a correlative relationship determining unit which determines a correlative relationship between time lapse and an increase of said filter differential pressure based on said time series data of said filter differential pressure collected by said data collector; and
 a lifespan estimator which estimates the lifespan of said hydraulic pump based on said correlative relationship determined by said correlative relationship determining unit.

16. A hydraulic pump health monitoring system for a hydraulic machine, comprising a hydraulic pump, a drain filter which captures contaminants included in operating oil which flows to a drain of said hydraulic pump, a differential pressure sensor which measures a filter differential pressure across said drain filter, and a temperature sensor which measures the temperature of said operating oil, comprising:
 a data collector which collects time series data of said filter differential pressure from said differential pressure sensor;
 a correlative relationship determining unit which determines a correlative relationship between the lapse time over a specified long period of time and said filter differential pressure based on said time series data of said filter differential pressure collected by said data collector; and
 a judgment unit which determines a degree of deviation between said long-term correlative relationship determined by said correlative relationship determining unit and said filter differential pressure data over a specified recent short period of time, and estimate the lifespan or judge said hydraulic pump abnormalities based on said determined degree of deviation.

* * * * *